United States Patent
Klimker

(10) Patent No.: US 9,313,338 B2
(45) Date of Patent: *Apr. 12, 2016

(54) SYSTEM, DEVICE, AND METHOD OF VOICE-OVER-IP COMMUNICATION

(71) Applicant: Oren Klimker, Shoham (IL)

(72) Inventor: Oren Klimker, Shoham (IL)

(73) Assignee: AUDIOCODES LTD., Lod (IL)

(*) Notice: Subject to any disclaimer, the term of this patent is extended or adjusted under 35 U.S.C. 154(b) by 28 days.

This patent is subject to a terminal disclaimer.

(21) Appl. No.: 14/341,859

(22) Filed: Jul. 28, 2014

(65) Prior Publication Data

US 2014/0334484 A1  Nov. 13, 2014

Related U.S. Application Data

(63) Continuation-in-part of application No. 13/531,542, filed on Jun. 24, 2012, now Pat. No. 8,831,001.

(51) Int. Cl.
| | |
|---|---|
| *H04L 12/823* | (2013.01) |
| *H04M 7/00* | (2006.01) |
| *H04L 29/06* | (2006.01) |
| *H04L 12/853* | (2013.01) |
| *H04L 12/841* | (2013.01) |
| *H04L 12/801* | (2013.01) |

(52) U.S. Cl.
CPC ............ *H04M 7/006* (2013.01); *H04L 47/2416* (2013.01); *H04L 47/28* (2013.01); *H04L 47/34* (2013.01); *H04L 65/604* (2013.01); *H04L 65/605* (2013.01); *H04L 65/608* (2013.01); *H04L 65/80* (2013.01)

(58) Field of Classification Search
CPC ................... H04L 12/6418; H04L 2012/6472; H04L 2012/6481; H04L 2012/6489; H04L 47/28; H04L 47/34; H04L 65/80; H04L 47/2416; H04L 65/605; H04L 65/608; H04L 65/604; H04L 47/32; H04L 45/74; H04M 7/006

See application file for complete search history.

(56) References Cited

U.S. PATENT DOCUMENTS

| | | | | |
|---|---|---|---|---|
| 6,300,887 B1* | 10/2001 | Le | ............ | H04L 29/06 341/60 |
| 6,678,267 B1* | 1/2004 | Anandakumar | ...... | H04L 12/413 370/356 |
| 7,246,057 B1* | 7/2007 | Sundqvist | ............ | H04L 12/6418 704/219 |
| 2004/0252700 A1* | 12/2004 | Anandakumar | .. | H04L 29/06027 370/395.21 |
| 2007/0206645 A1* | 9/2007 | Sundqvist | ............ | H04L 12/6418 370/516 |
| 2008/0192662 A1* | 8/2008 | Bergstrom | .......... | H04W 36/026 370/310 |
| 2009/0138959 A1* | 5/2009 | Im | ........................ | H04L 63/1441 726/13 |
| 2011/0026581 A1* | 2/2011 | Ojala | ....................... | G10L 19/24 375/240 |
| 2011/0194692 A1* | 8/2011 | Carpenter | ................. | H04K 1/00 380/255 |
| 2013/0155866 A1* | 6/2013 | Sun | ....................... | H04L 65/605 370/241 |

* cited by examiner

Primary Examiner — Jung-Jen Liu
(74) Attorney, Agent, or Firm — Eitan, Mehulal & Sadot

(57) ABSTRACT

The present invention includes devices, systems, and methods of Voice-over-Internet Protocol (VoIP) communication. For example, a method includes: receiving a data stream comprising a set of VoIP packets; and modifying a Real Time Protocol (RTP) header of at least one of said VoIP packets to modify a jitter buffer delay of said data stream. Optionally, the method includes decreasing the jitter buffer delay by: dropping at least one packet from said data stream; and decreasing a sequence number and a timestamp value in an RTP header of at least one additional packet subsequent to said at least one packet. Optionally, the method includes increasing the jitter buffer delay by: identifying a pair of consecutive packets in the incoming data stream, the pair of consecutive packets having consecutive sequence numbers; and increasing a sequence number in an RTP header of at least a latter packet in said pair of consecutive packets.

25 Claims, 5 Drawing Sheets

SYSTEM, DEVICE, AND METHOD OF VOICE-OVER-IP COMMUNICATION

CROSS-REFERENCE TO RELATED APPLICATIONS

This application is a Continuation-in-Part (CIP) of U.S. patent application Ser. No. 13/531,542, filed on Jun. 24, 2012, which is hereby incorporated by reference in its entirety.

FIELD OF THE INVENTION

The present invention relates to the field of Voice over Internet Protocol (VoIP) communication.

BACKGROUND

A VoIP network may include various VoIP components, for example, wired Internet Protocol (IP) phones, wireless IP phones, and one or more gateways. Optionally, a Session Border Controller (SBC) may mediate between an internal VoIP network (e.g., operable within an organization or enterprise) and an external VoIP network, or vice versa, or between other two networks.

Some VoIP networks may suffer from jitter, e.g., variance in the delay at which VoIP packets arrive at a VoIP component. Some VoIP components in an internal VoIP network may be able to partially handle jitter, up to a certain threshold typically dictated by a size of a local jitter buffer.

In some VoIP systems, jitter originating from an external VoIP or wireless network may be large and may not be properly handled or corrected by a local VoIP component. This may degrade quality of voice calls incoming from such external VoIP network.

SUMMARY

The present invention may include, for example, a device, a system, and a method of VoIP communication. For example, the present invention may adjust, modify, increase and/or decrease a jitter buffer delay, by selectively modifying Real Time Protocol (RTP) headers of VoIP packets in a data stream, and/or by dropping or removing VoIP packets from the data stream.

In accordance with the present invention, for example, a method of Voice over Internet Protocol (VoIP) communication may include: receiving a data stream comprising a set of VoIP packets; and modifying a Real Time Protocol (RTP) header of at least one of said VoIP packets to modify a jitter buffer delay of said data stream.

In accordance with the present invention, for example, the method may include decreasing the jitter buffer delay by: dropping at least one packet from said data stream; and decreasing a sequence number and a timestamp value in an RTP header of at least one additional packet subsequent to said at least one packet.

In accordance with the present invention, for example, the method may include decreasing a sequence number and a timestamp value in RTP headers of all packets subsequent to said at least one packet.

In accordance with the present invention, for example, the method may include increasing the jitter buffer delay by: identifying a pair of consecutive packets in the incoming data stream, the pair of consecutive packets having consecutive sequence numbers; and increasing a sequence number in an RTP header of at least a latter packet in said pair of consecutive packets.

In accordance with the present invention, for example, the method may include increasing a sequence number in RTP headers of all packets in said data stream starting at said latter packet and onward.

In accordance with the present invention, for example, increasing the sequence number may include: increasing the sequence number by a natural number computed by taking into account a target increase in the jitter buffer delay.

In accordance with the present invention, for example, the method may include modifying the RTP header without decoding a payload of any VoIP packet of said data stream.

In accordance with the present invention, for example, the method may include modifying the RTP header without re-encoding a payload of any VoIP packet of said data stream.

In accordance with the present invention, for example, the method may include detecting a portion of the data stream which corresponds to a silence period; and modifying the RTP headers of one or more VoIP packets of that portion of the data stream more frequently relative to other one or more portions of said data stream.

In accordance with the present invention, for example, an apparatus of Voice over Internet Protocol (VoIP) communication may include: a jitter buffer to receive a data stream comprising a set of VoIP packets; and a Real Time Protocol (RTP) header modifier to modify an RTP header of at least one of said VoIP packets to modify a jitter buffer delay of said data stream.

In accordance with the present invention, for example, the RTP header modifier is to decrease the jitter buffer delay; wherein the apparatus comprises a jitter buffer correction logic to drop at least one packet from said data stream; and the RTP header modifier is to decrease a sequence number and a timestamp value in an RTP header of at least one additional packet subsequent to said at least one packet.

In accordance with the present invention, for example, the RTP header modifier is to decrease a sequence number and a timestamp value in RTP headers of all packets subsequent to said at least one packet.

In accordance with the present invention, for example, the RTP header modifier is to increase the jitter buffer delay; the apparatus comprises a jitter buffer correction logic to identify a pair of consecutive packets in the incoming data stream, the pair of consecutive packets having consecutive sequence numbers; and the RTP header modifier is to increase a sequence number in an RTP header of at least a latter packet in said pair of consecutive packets.

In accordance with the present invention, for example, the RTP header modifier is to increase a sequence number in RTP headers of all packets in said data stream starting at said latter packet and onward.

In accordance with the present invention, for example, the RTP header modifier is to increase the sequence number by a natural number computed by taking into account a target increase in the jitter buffer delay.

In accordance with the present invention, for example, the RTP header modifier is to modify the RTP header without decoding a payload of any VoIP packet of said data stream.

In accordance with the present invention, for example, the RTP header modifier is to modify the RTP header without re-encoding a payload of any VoIP packet of said data stream.

In accordance with the present invention, for example, the apparatus may include a jitter buffer correction logic to detect a portion of the data stream which corresponds to a silence period; and the RTP header modifier is to modify the RTP headers of one or more VoIP packets of that portion of the data stream more frequently relative to other one or more portions of said data stream.

In accordance with the present invention, for example, the jitter buffer is to receive a first data stream portion and a second, subsequent, data stream portion; for the first data stream portion, the RTP header modifier is to decrease the jitter buffer delay; and for the second data stream portion, the RTP header modifier is to increase the jitter buffer delay.

In accordance with the present invention, for example, the apparatus may be or may include a session border controller.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF THE PRESENT INVENTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that a conventional Session Border Controller (SBC) may unnecessarily perform a process of decoding the payload data of VoIP packets, performing jitter correction using a jitter buffer (which may optionally have a dynamically-adjustable size), re-encoding the payload data of the VoIP packets, and then packing the re-encoded VoIP packets with a Real Time Protocol (RTP) header. This process may degrade the quality of voice carried by the VoIP packets, and may also consume unnecessary processing resources.

Applicants have further realized that utilization of a jitter buffer having a dynamically-adjustable size (e.g., based on an estimation of the delay in arrival of packets) may not suffice to adequately mitigate jitter buffer in VoIP networks. For example, an adjustable-size jitter buffer may need to increase the delay by adding packets or samples, or may need to reduce the delay by dropping packets or samples. However, in VoIP systems that utilize a low bitrate voice CODEC, adding or dropping packets or samples may degrade voice quality, particularly if decoding and re-encoding is not utilized and/or if packet loss concealment is not utilized or cannot be utilized.

The present invention may include, for example, adaptive jitter buffering which may obviate the need to decode and re-encode VoIP packets. Compressed data of a VoIP media stream may be transferred from an external VoIP network to a VoIP component without decoding and/or re-encoding of payload data. Jitter may be eliminated or reduced by deleting an RTP packet and/or by manipulating (or modifying) RTP header(s) of VoIP packet(s).

Figure 1:
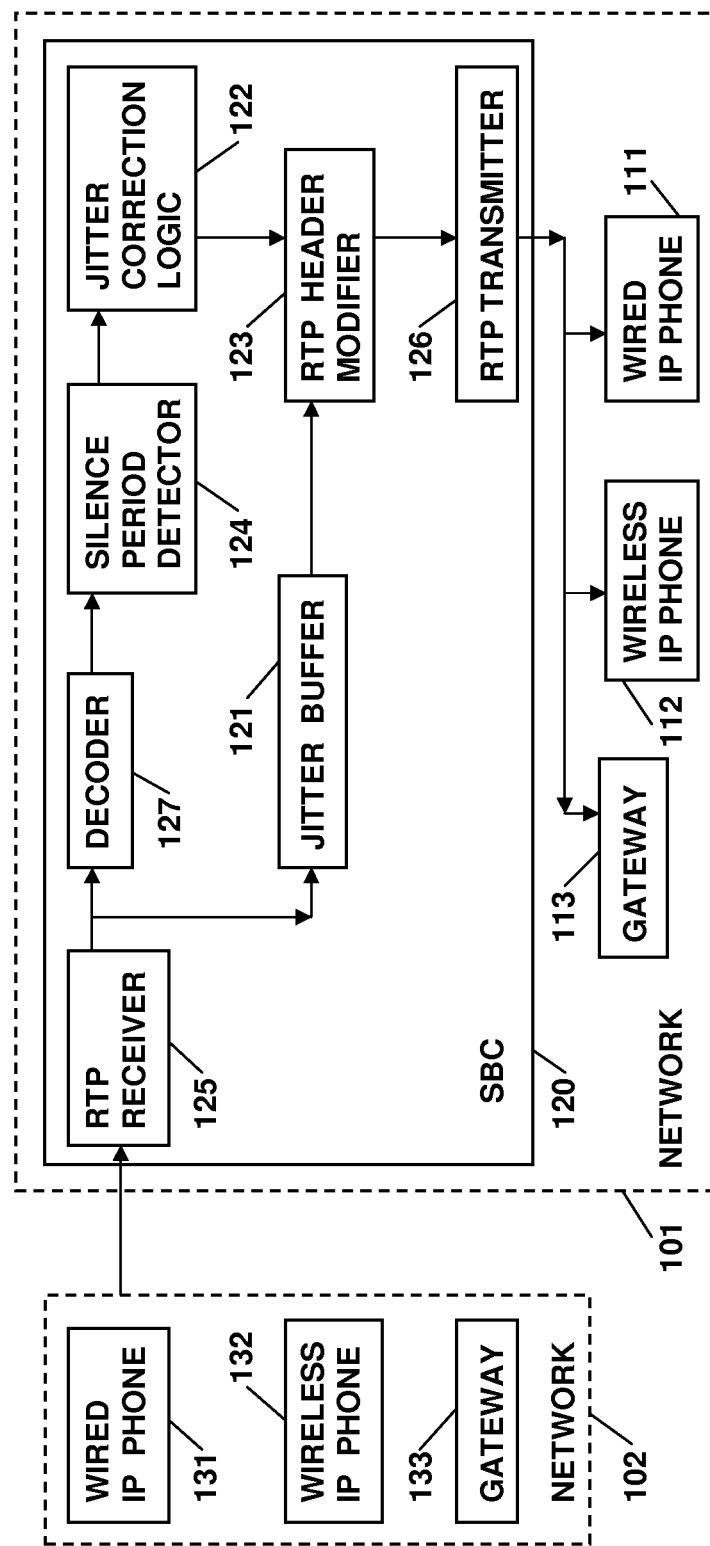
FIG. 1 is a schematic block diagram illustration of a communication system in accordance with the present invention.

Reference is made to FIG. 1, which is a schematic block diagram illustration of a communication system 100 in accordance with the present invention. System 100 may include one or more VoIP networks, for example, networks 101 and 102. In a demonstrative implementation, network 101 may be a low-jitter VoIP network which may operate, for example, internally within an organization or enterprise; whereas network 102 may be a high-jitter VoIP network which may be, for example, external to such organization or enterprise, or may be a wireless network or a Wide Area Network (WAN).

Network 101 may include one or more VoIP clients, for example, one or more wired IP phones 111 and/or one or more wireless IP phones 112. Similarly, network 102 may include one or more VoIP clients, for example, one or more wired IP phones 131 and/or one or more wireless IP phones 132. Network 101 and/or network 102 may optionally include other or additional components; for example, an optional gateway 113 is shown as part of network 101, and an optional gateway 133 is shown as part of network 102.

System 100 may include a session border controller (SBC) 120, which is shown for demonstrative purposes as part of network 101. It is noted that SBC 120 may be implemented, for example, as part of network 101, as part of network 102, or as a separate mediating component which may be connected between network 101 and network 102. Optionally, one or more of the functionalities that are discussed herein with reference to SBC 120, may be performed by other component(s) or communication mediating units.

SBC 120 may include, for example, an RTP receiver 125 to receive an incoming RTP stream or incoming RTP packets; a jitter buffer 121; a jitter correction logic unit 122; an RTP header modifier 123 and an RTP transmitter 125 to generate the output of modified RTP packets. SBC 120 may optionally include a silence period detector 124, which may optionally utilize a decoder 127 for detecting silence period(s).

Jitter buffer 121 may be or may include, for example, a jitter buffer having a fixed size, or a jitter buffer having a dynamically-adjusted size. Jitter buffer 121 may be operating at a state in which the jitter buffer delay is excessive and should be decreased; or conversely, at a state in which the jitter buffer delay is insufficient and should be increased. Such increase or decrease in the jitter buffer delay may be determined and/or performed by jitter correction logic unit 122 and/or by RTP header modifier 123, as described herein.

Jitter correction logic unit 122 may include circuitry, logic or module(s) to determine whether or not jitter associated with an incoming data stream requires RTP header modification by RTP header modifier 123. For example, if jitter correction logic unit 122 determines that the jitter is at a level which may not be appropriately handled by jitter buffer 121 (e.g., due to a limited size of jitter buffer 121), then one or more VoIP packets of the data stream may be subject to RTP header modification by RTP header modifier 123. Alternatively, if jitter correction logic unit 122 determines that the jitter is at a level which may be handled by jitter buffer 121, then one or more VoIP packets may bypass RTP header modifier 123, or may not be subject to RTP header modification or manipulation.

If jitter buffer 121 decreases the delay between VoIP packets, then jitter correction logic unit 122 may determine to drop an RTP packet; and RTP header modifier 123 may update the RTP headers of subsequent VoIP packets. For example, RTP sequence number and RTP timestamp of subsequent RTP headers may be updated to be sequential, such that RTP packet loss may not be noticed by a remote VoIP component.

Conversely, if jitter buffer 121 increases the delay between VoIP packets, then jitter correction logic unit 122 may determine that RTP header modifier 123 is to modify the RTP header of the following VoIP packet by incrementing the sequence number and timestamp of that VoIP packet (or of a set of packets that follow, or of substantially all the packets that follow in that data stream). This may cause the remote VoIP component to recognize a packet loss, and may cause it to generate one or more additional VoIP packet(s). For example, the remote VoIP component may utilize a suitable packet loss concealment method.

In accordance with the present invention, it may be preferred or advantageous to perform RTP header modification for purposes of jitter buffer delay adjustment, particularly and/or selectively during silence period(s), or with regard to portions of the data stream that correspond to silence (rather than to voice or speech or audible utterances). For example, silence period may be more suitable for dropping packet(s), and/or for modifying sequence number and/or timestamp of packet header(s), without affecting or degrading call quality or voice quality, and without dropping speech utterances. Accordingly, RTP header modification may optionally be performed particularly during silence periods or non-voice-activity periods, or may be performed more frequently during silence periods or non-voice-activity periods. For this purpose, silence period detector 124 may be optionally included in SBC 120 or in jitter correction logic unit 122, and may detect a silence period, for example, based on payload data decoded by optional decoder 127 (but without re-encoding or transcoding payload data) or based on other indicators of silence. It would be appreciated that although some conventional systems may detect silence periods in order to possibly perform other types of maintenance or voice-improvement processes, the present invention may be used in order to particularly and selectively modify RTP headers (and/or drop VoIP packets) preferably during a detected silence period, rather than during a speech period or voice period.

A faster rate of RTP packet addition/deletion or header modification may be used if system 100 utilizes a voice coder capable of better handling packet loss. Accordingly, jitter buffer delay adjustment rate may be adapted or modified in real time to suit the voice coder or CODEC being used. For example, the rate of RTP packet addition/deletion or header modification may be hard-coded or pre-defined, may be programmable, or may be otherwise modifiable or adjustable, e.g., by jitter correction logic unit 122.

Although portions of the discussion herein may relate, for demonstrative purposes, to dropping or removal of a single VoIP packet, the present invention may include dropping or removal of multiple VoIP packets, which may be consecutive and/or non-consecutive, in order to adjust the jitter buffer delay.

Although portions of the discussion herein may relate, for demonstrative purposes, to modifying the sequence number of an RTP header of a single VoIP packet, the present invention may include modifying the sequence number of RTP headers of multiple VoIP packets, which may be consecutive and/or non-consecutive (or may include substantially all the VoIP packets of a data stream, or may include substantially all the VoIP packets following a particular setoff in the data stream), in order to adjust the jitter buffer delay.

Figure 2A:
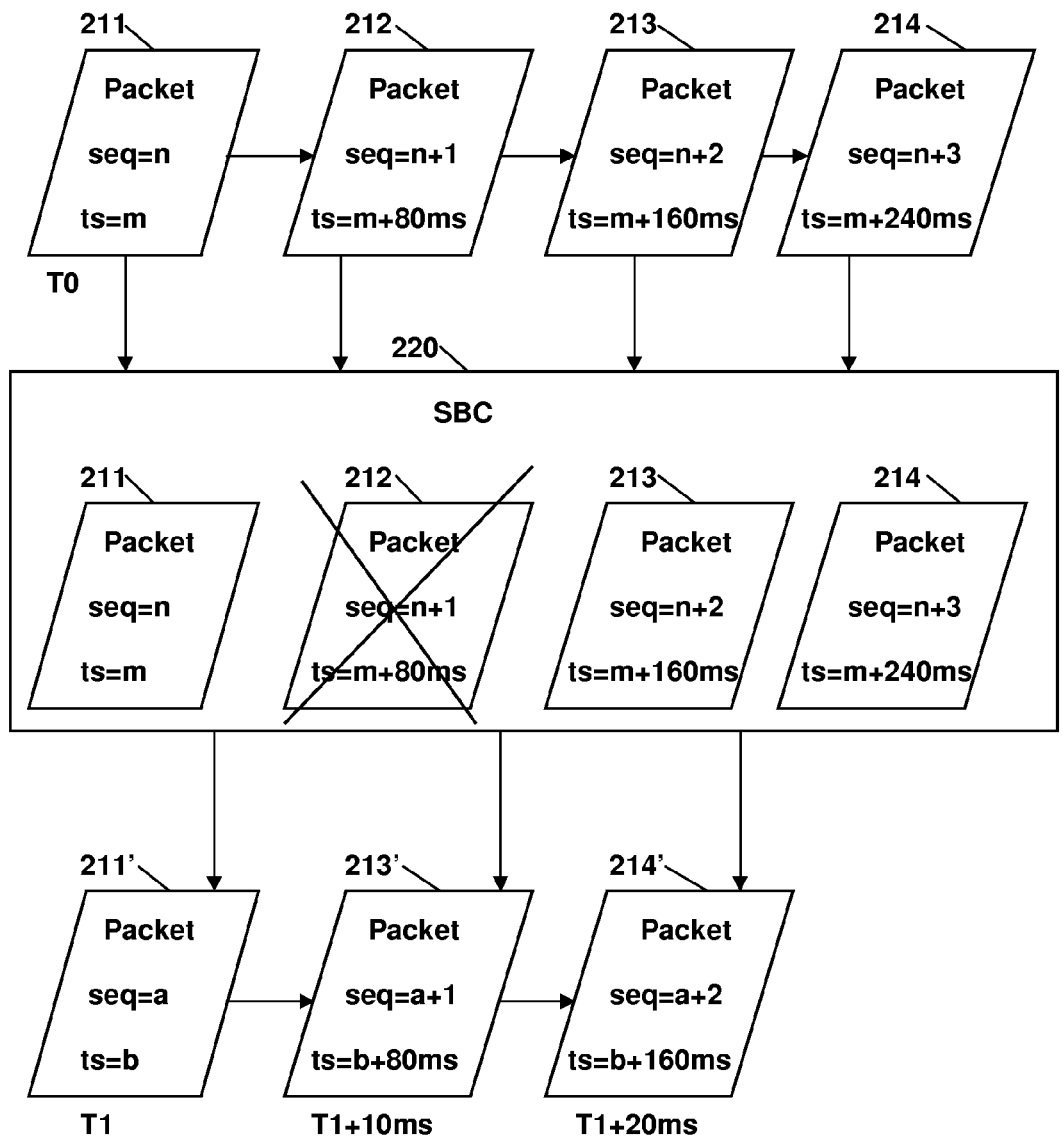
FIG. 2A is an illustration demonstrating the operation of an SBC which decreases the jitter buffer delay, in accordance with the present invention.

Reference is made to FIG. 2A, which is an illustration demonstrating an SBC 220 which decreases the jitter buffer delay associated with an incoming data stream by utilizing packet dropping and RTP header modification, in accordance with the present invention. SBC 220 of FIG. 2A may be generally similar to SBC 120 of FIG. 1.

A top portion of FIG. 2A shows an incoming data stream having four VoIP packets 211-214. An RTP header of packet 211 may have a sequence number of n, wherein n may be a positive number or zero; an RTP header of packet 212 may have a sequence number of n+1; an RTP header of packet 213 may have a sequence number of n+2; and an RTP header of packet 214 may have a sequence number of n+3. Furthermore, the RTP header of packet 211 may have a timestamp of m (e.g., measured in milliseconds); the RTP header of packet 212 may have a timestamp of m+80 milliseconds; the RTP header of packet 213 may have a timestamp of m+160 milliseconds; and the RTP header of packet 214 may have a timestamp of m+240 milliseconds.

In the demonstrative example shown, the incoming packets 211-214 packets arrive to SBC 220 at time point T0 (namely, the first VoIP packet 211 arrives to SBC 220 at time point T0), and the output generated by SBC 220 exits SBC 220 starting at a later time point T1. The difference $\Delta=T1-T0$ may is the jitter buffer delay, which may be adjusted or modified (e.g., reduced, in the example shown in FIG. 2A) in accordance with the present invention.

A central portion of FIG. 2A shows the data stream as handled within SBC 220, such that one of the VoIP packets (packet 212) is dropped or removed from the data stream by SBC 220. Furthermore, SBC 220 modifies the RTP headers of the remaining packets, to generate an output data stream which is shown in the bottom portion of FIG. 2A. Whereas the input data stream included four VoIP packets (211-214), the output data stream includes only three VoIP packets (denoted 211', 213' and 214'). Moreover, the RTP headers of the three VoIP packets 211', 213' and 214' was modified by SBC 220 as follows: their sequence numbers may be, for example, a, a+1, and a+2 (respectively), and their timestamp values may be, for example, b, b+80, and b+160 (respectively). It is noted that SBC 220 may output the modified data stream including the three VoIP packets 211', 213' and 214' at particular points in time, for example, at time points T1, T1+10 milliseconds, and T1+20 milliseconds (respectively).

As demonstrated, the four incoming VoIP packets 211-214, which spanned 240 milliseconds and occupied four consecutive sequence numbers, have been modified. SBC 220 dropped one VoIP packet (212), and modified the RTP headers of the three other VoIP packets (211, 213, 214) thereby generating a shorter data stream having only three VoIP packets (211', 213', 214'), which span only 160 milliseconds (instead of 240 milliseconds) and occupy only three consecutive sequence numbers (instead of four consecutive sequence numbers). Accordingly, the jitter buffer delay is decreased.

Optionally, a VoIP packet may be maintained by SBC 220 in a substantially unmodified form. A VoIP packet which is referred to herein as being "maintained", may optionally include a VoIP packet having an RTP header that has been modified or manipulated in accordance with the present invention. For example, even an RTP header of such a "maintained" VoIP packet (e.g., a first VoIP packet in a data stream) may optionally be modified to reflect an updated or modified offset within the data stream. In accordance with the present invention, "maintaining" of a VoIP packet may include, for example, maintaining the timestamp difference between that VoIP packet and its immediately-preceding VoIP packet, and/or maintaining the sequence number difference between that VoIP packet and its immediately-preceding VoIP packet.

For demonstrative purposes, FIG. 2A shows the output RTP stream frame duration as 10 milliseconds; such that each RTP packets carries data corresponding to 10 milliseconds. Other suitable values of RTP frame duration may be used.

Figure 2B:
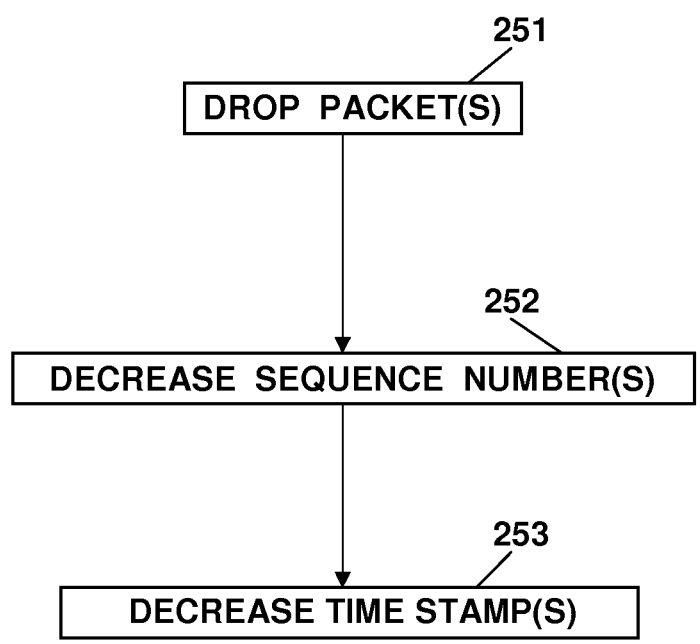
FIG. 2B is a schematic flowchart of a method of decreasing jitter buffer delay, in accordance with the present invention.

Reference is made to FIG. 2B, which is a schematic flowchart of a method of decreasing jitter buffer delay, in accordance with the present invention. The method may be implemented, for example, by system 100 of FIG. 1, by SBC 120 of FIG. 1, by SBC 220 of FIG. 2A, or by other suitable systems or devices.

The method may optionally include, for example, dropping one or more VoIP packets (block 251); decreasing a sequence number in an RTP header of one or more VoIP packets subsequent to the dropped packet (block 252); and decreasing a timestamp in an RTP header of each one of one or more VoIP packets that are subsequent to the dropped packet (block 253). Other suitable operations may be used in accordance with the present invention.

Figure 3A:
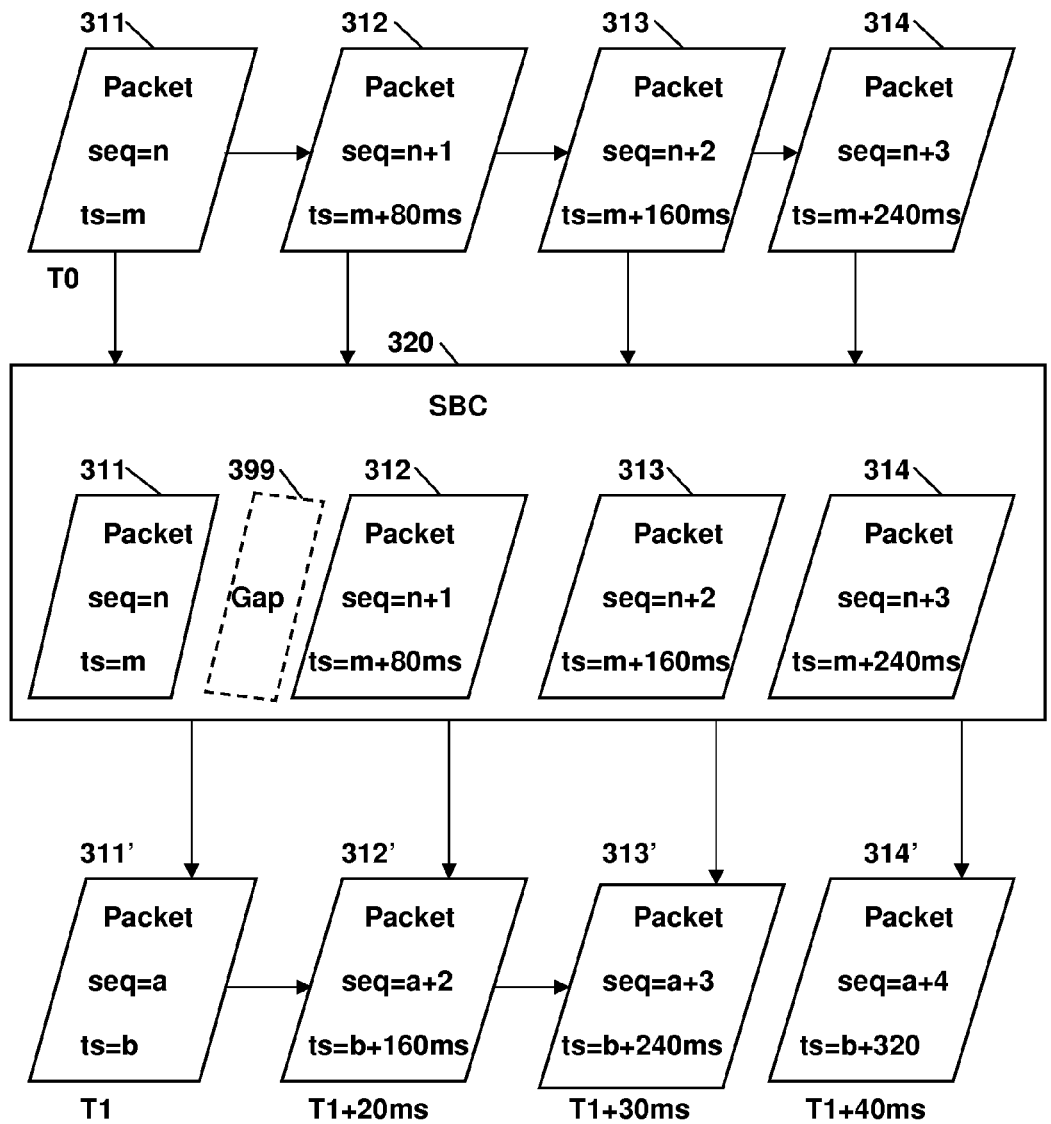
FIG. 3A is an illustration demonstrating the operation of an SBC which increases the jitter buffer delay, in accordance with the present invention.

Reference is made to FIG. 3A, which is an illustration demonstrating an SBC 320 which increases the jitter buffer delay associated with an incoming data stream by utilizing RTP header modification, in accordance with the present invention. SBC 320 of FIG. 3A may be generally similar to SBC 120 of FIG. 1.

A top portion of FIG. 3A shows an incoming data stream having four VoIP packets 311-314. An RTP header of packet 311 may have a sequence number of n, wherein n may be a positive number or zero; an RTP header of packet 312 may have a sequence number of n+1; an RTP header of packet 313 may have a sequence number of n+2; and an RTP header of packet 314 may have a sequence number of n+3. Furthermore, the RTP header of packet 311 may have a timestamp of m (e.g., measured in milliseconds); the RTP header of packet 312 may have a timestamp of m+80 milliseconds; the RTP header of packet 313 may have a timestamp of m+160 milliseconds; and the RTP header of packet 314 may have a timestamp of m+240 milliseconds.

A central portion of FIG. 3A shows the data stream as handled within SBC 320. A gap 399 is shown, but it does not exist within the data stream. Rather, SBC 320 modifies the RTP headers of VoIP packets 311-314, to generate an output data stream which is shown in the bottom portion of FIG. 3A, and which "leaves room" for a remote VoIP component to compensate for gap 399 (e.g., utilizing a suitable packet loss concealment method). Whereas the input data stream included four VoIP packets (311-314), the output data stream similarly includes four VoIP packets (denoted 311', 312', 313' and 314') having modified RTP headers. The sequence numbers of the four VoIP packets 311', 312', 313' and 314' having the modified RTP headers may be, for example, a, a+2, a+3, and a+4 (respectively), skipping and leaving a "gap" of one sequence number (a+1); and their timestamp values may be, for example, b, b+160, b+240 and b+320 (respectively), skipping and leaving a "gap" at timestamp b+80. It is noted that SBC 320 may output the modified data stream including the four VoIP packets 311', 312', 313' and 314' having the modified RTP headers at particular points in time, for example, at time points T1, T1+20 milliseconds, T1+30 milliseconds, and T1+40 milliseconds (respectively), skipping and leaving a "gap" at time point T1+10.

As demonstrated, the four incoming VoIP packets 311-314, which spanned 240 milliseconds and occupied four consecutive sequence numbers, were modified: particularly, their RTP headers have been modified such that the four VoIP packets 311'-314' that exit SBC 320 span 320 milliseconds (instead of 240 milliseconds) and span over a range of five consecutive sequence numbers (the range from "a" to "a+4", including the sequence numbers of a, a+2, a+3 and a+4, and skipping the sequence number of a+1). Accordingly, the jitter buffer delay is increased.

Figure 3B:
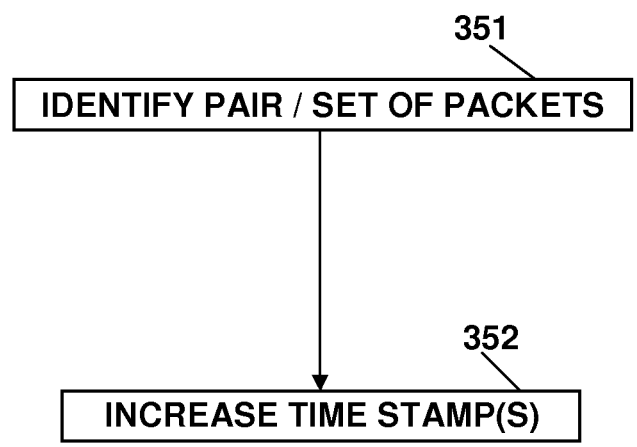
FIG. 3B is a schematic flowchart of a method of increasing jitter buffer delay, in accordance with the present invention.

Reference is made to FIG. 3B, which is a schematic flowchart of a method of increasing jitter buffer delay, in accordance with the present invention. The method may be implemented, for example, by system 100 of FIG. 1, by SBC 120 of FIG. 1, by SBC 320 of FIG. 3A, or by other suitable systems or devices.

The method may optionally include, for example, identifying a pair of two consecutive VoIP packets (or set or group of other number of VoIP packets) in the incoming data stream, e.g., which have consecutive sequence numbers (e.g., sequence numbers of 0 and 1, respectively) (block 351); and increasing the sequence number in the RTP header of (at least) the latter packet in that pair (or set) of packets (block 352), and optionally also in the RTP headers of subsequent VoIP packets in that data stream. Optionally, the sequence number of the latter packet may be increased by K units, wherein K is a natural number which may be computed as: the difference between the timestamp values of the two packets, divided by a standard or typical timestamp interval of a non-delayed data stream. The timestamp values in the RTP headers of those VoIP packets may be similarly modified (e.g., increased). The increase of the sequence numbers, and of the time stamps, may be calculated based on the desired or target increase in the jitter buffer delay. Other suitable operations may be used in accordance with the present invention.

The present invention may include correction, elimination or reduction of external network jitter of incoming RTP packets, which may be routed to local VoIP phones or local gateways. The present invention may be implemented, for example, in an SBC device, or between an SBC device and the elements of a local VoIP network (e.g., local IP phones and/or gateways). Adaptive jitter buffering may be performed without decoding and re-encoding of the VoIP media stream; and compressed data may be transferred "as is" to the suitable local VoIP component, optionally with a modified RTP header.

In accordance with the present invention, jitter buffer delay adjustment may be implemented without decoding and re-encoding of VoIP payload data or packets. Rather, the implementation may include deletion of RTP packet(s) and/or modification (or manipulation) of RTP packet header(s).

In accordance with the present invention, adjustment of jitter buffer delay may be performed by manipulating or modifying the RTP headers of substantially all VoIP packets of an incoming a data stream, or by manipulating or modifying the RTP headers of substantially all VoIP packets starting from a particular offset of an incoming a data stream.

In accordance with the present invention, substantially all the differences of timestamps and/or substantially all the differences of sequence numbers, of an incoming data stream, or of a portion of the data stream starting at a particular offset and onward, may be modified by manipulation or modification of RTP headers.

In accordance with the present invention, jitter buffer delay may be adjusted without decoding payload data of VoIP packet; or, without decoding and then re-encoding of payload data of VoIP packet. For example, payload data of VoIP packets may be decoded in order to identify silence period(s), such that RTP header modification for purposes of jitter buffer delay adjustment may be performed (exclusively, or more frequently) during such identified silence period(s); however, the present invention may not require or may not utilize substantially any re-encoding or transcoding of payload data (which may typically degrade voice quality and/or may typically require processing resources). Additionally or alternatively, silence period(s) may be identified or detected or recognized by utilizing other means or indicators which may not necessarily include decoding of payload data in the RTP stream, for example, by analyzing additional or other information in the RTP packets and/or in the RTP stream and/or in RTP headers. For example, an RTP header may optionally include a flag or indication that the RTP packet is a silence period, and this indication in the RTP header may be used for silence period identification for purposes of jitter buffer delay adjustment. Additionally or alternatively, for example, a vocoder or voice encoder may include a signal level or a parameter that is correlated with signal level (where signal level can be estimated based on it) in the compressed or encoded voice packets; and such signal level indication or parameter may be used by the present invention in order to identify silence period(s).

The methods and operations of the present invention may be used in conjunction with various devices, systems, components, communication standards and/or communication protocols, for example, silence compression, speech coder compression algorithm(s), media protection, Secure RTP (SRTP), packet redundancy schemes, or the like.

In accordance with the present invention, an SBC may be able to handle an incoming RTP stream which arrives with re-order or out-of-order, and/or an incoming RTP stream which arrives with packet loss or suffering from lost packets. The SBC may take into account such deficiencies or characteristics of the incoming RTP stream, and may generate the output RTP stream with the modified RTP header(s) accordingly.

The present invention may optionally be used in conjunction with RTP trans-rating, or modification of RTP framing, or modification of the size of RTP frames, or modification of the difference (e.g., in milliseconds) between two consecutive RTP frames. For example, in accordance with the present invention, an SBC may receive an RTP input stream having a frame duration of 10 milliseconds; and the SBC may output an RTP stream having a frame duration of 60 milliseconds, together with implementing the suitable RTP header manipulation at the resolution of the output RTP stream.

The present invention may be utilized in conjunction with a non-standard communication protocol, for example, a proprietary variant or version which of a real-time transport protocol which may be similar to (but not identical) to the standard RTP, e.g., utilizing proprietary or non-proprietary headers which may optionally include, timestamp and/or sequence number and/or equivalent or other parameters. Accordingly, the "RTP header modification" described herein, may thus include modification of such non-RTP header, or modification of a header of such variant protocol, proprietary protocol, or any other suitable protocol which may carry voice and/or video and/or other media type, or the like.

Although portions of the discussion herein may relate, for demonstrative purposes to VoIP packets and/or to voice streams or packets, the present invention may be utilized in conjunction with types of packets and/or streams, for example, non-voice audio streams or packets, video streams or packets, multimedia streams or packets, or the like.

In accordance with the present invention, the SBC may be able to receive a first data stream and then a second, subsequent, data stream. For the first data stream, the RTP header modifier may decrease the jitter buffer delay; and for the second data stream, the RTP header modifier may increase the jitter buffer delay; or vice versa.

In accordance with the present invention, the SBC may be able to receive a data stream having a first portion and then a second (consecutive or non-consecutive) portion. For the first portion of the data stream, the RTP header modifier may decrease the jitter buffer delay; and for the second portion of the data stream, the RTP header modifier may increase the jitter buffer delay; or vice versa.

Some embodiments of the present invention may optionally utilize an audio codec or a coder algorithm or codec algorithm (e.g., Opus audio codec, or similar or other codecs or algorithms), in order to apply additional coding methods, entropy coding methods, range coding, and/or lossless coding methods on the already-compressed (e.g., already lossy) bit-stream of audio data that is intended to be transported or transmitted from a local transmitter to a remote receiver.

For example, an SBC may include a jitter buffer; the SBC may be connected to a local network and may receive (e.g., from local devices, such as a local VoIP phone terminal) audio packets that are intended to be transmitted over IP to a remote receiver. The data packets that the SBC receives locally from the local device, may be received in a structure which arranges multiple frames in a single packet. The SBC receives such "multiple-frame packet" from the local device; but in order to store each frame (separately, discretely) in the jitter buffer of the SBC, the SBC needs to temporarily divide or split a "multiple-frame packet" into discrete frames; and the output of the jitter buffer would later need to re-combine multiple frames into a single outgoing packet. The SBC may utilize an entropy audio codec or en entropy codec, such that the local bit-stream may be entropy-decoded in order to split or divide an incoming multi-frame packet back to its discrete frames, prior to placement of such received frame into the jitter buffer of the SBC. Then, at the SBC, the packets may be entropy-encoded back when the frames are taken out of the jitter buffer and are being composed or combined to a single packet, before the multi-frame packet is transmitted over IP network to a remote receiver.

In some embodiments, the RTP header(s) modification(s) and/or the jitter buffer corrections may be performed, preferably, during silence periods, or with regard to packets that are determined to correspond to silence. In other embodiments, due to severe jitter conditions (e.g., if a jitter delay of at least a pre-defined threshold period is detected), and/or if no silence periods (or no silence time-slots) are detected for at least a pre-defined threshold period, the RTP header modification and/or the jitter correction may be performed during non-silence periods. In some implementations, the RTP header modification, or frame insertion or frame deletion, may be performed in accordance with the following order of priority: (a) preferably, perform RTP header modification during silence frames; (b) as a second priority, perform RTP header modification during unvoiced frames or during voiceless frames (e.g., a non-silence frame in which the vocal cords of a speaker do not vibrate, such as, during a long "ssss" sound, or other frames that are determined to be "unvoiced frames" even though they are not "silence frames"); (c) as a third priority, perform RTP header modification during voiced frames that are analyzed by ZIR/ZSR of LTP and/or LPC filters, as described herein; namely, as a third priority, perform RTP header modification during voiced frames in a way that minimizes the defect (or degradation) in voice quality, and the frames whose RTP headers are modified may be selected by analyzing ZIR and ZSR response of LTP and/or LPC filters, as described herein; (d) as a fourth and lowest priority, perform RTP header modification during other types of voiced frames, or during any voiced frame(s) without further differentiation among voiced frames.

In contrary to sample-based jitter buffer, in a voice-based jitter buffer, deleting or adding a compressed voice frame may result in a significant impact on the voice quality for a much longer time relative to the duration of the frame. The voice decoder may comprise LPC filter and/or LTP filter (or a combined LPC-LTP filter). The decoder output may be highly influenced by the history of the signal. When selecting a frame to delete or a location to insert a frame, some embodiments of the present invention may ensure that the impact on the decoder output of the next frame will be minimal or non-significant.

In some embodiments, jitter corrections (namely, RTP header modifications) that increase the delay (e.g., frame insertion; incrementing or increasing the RTP header sequence number), may be preferably performed during voiced frames for which the following condition(s) hold true: (a) the Zero Input Response (ZIR) of a Long Term Prediction (LTP) filter, and/or (b) the ZIR of a Linear Prediction Coefficients (LPC) filter, (or, the ZIR of both LTP and LPC filters in response to an excitation), are smaller than Zero State Response (ZSR). In accordance with some embodiments of the invention, when the relative importance of initial conditions is small, it is safer for the system to assume that the effect of violation of synchronization between the encoder and decoder may decay rapidly.

In some embodiments, jitter corrections (namely, RTP header modifications) that reduce or decrease the delay (e.g., packet deletion; decreasing the RTP header sequence), may be preferably performed during voiced frames for which the following condition holds true: the ZIR of the LTP filter, and/or the ZIR of the LPC filter, and/or the ZIR of combined LTP and ZIR filters, for frame which is candidate for deletion, is identical or very similar or very close (e.g., being not more than K percent different in value, where K may be 5 or 10 or 15 or 20 or 25 or 30 or 33 or 35 or 40 or 45 or 49 or 50 percent) relative to the ZIR of the previous frame. In accordance with some embodiments of the present invention, it may be safer to delete a frame between two frames that have similar state variables, as the deletion of the intermediate frame would probably be less noticeable. Other suitable calculations of comparison functions or threshold values may be used, in order to determine whether a particular frame (candidate for deletion) is "sufficiently close" or "relatively close" to the immediately-preceding frame; or if the ZIR value (or ZIR matrix, or ZIR array) of such candidate frame is "sufficiently close" or "relatively close" to the ZIR value (or ZIR matrix, or ZIR array) of the immediately-preceding frame.

The above may be utilized in conjunction with systems that use a module of LTP synthesis and/or LPC synthesis (e.g., by using LTP filter and/or LPC filter), for example, during audio decoding. ZIR indicates the zero input response of the LTP and LPC filters; whereas, ZSR indicates the zero state response of the LTP and LPC filters.

In some embodiments, the modified RTP header timestamp is not is not necessarily set to the presentation time, and does not necessarily correspond to the actual presentation time (or playback time) of the audio, and does not necessarily match the actual point-in-time of the presentation (or playback) time. The locally-performed modification of timestamp and sequence number parameters of the RTP headers, may be locally performed on the transmitting side in order to force (or elicit, or induce) a delay or a proceed in the packet play-out time at the remote device (which receives the packet after their transport over the IP network). For example the remote device may interpret packet loss, and may thus delay the play-out of the packet. The timestamp and sequence number of the RTP header are thus locally updated or manipulated in way that is expected to "deceive" a remote receiving device (or a remote play-out device), inducing such remote device to play-out the packet or frame at a time-point that is different from the time-point intended during the original recording or capturing of the audio. This may be in contrast to some conventional systems which may, at most, monotonically modify headers of packets in a monotonic manner, such that the modified headers have (necessarily) consecutive sequence numbers and non-skipping sequence numbers, without any "gaps" or sequence-number gaps between two adjacently-received frames or packets.

Some embodiments of the present invention may modify RTP headers, sequence-numbers and/or time-stamps in a non-monotonic manner, non-monotonically, in a differentiated manner; such that, for example, a first RTP header may be maintained as is; the sequence number of the next RTP header may be increased by 3; the sequence number of the next RTP header may be increased by 1; the sequence number of the next RTP header may be increased by 4; the sequence number of the next RTP header may be decreased by 2; and so forth, without following any pre-defined or pre-calculated modification pattern dictated by a linear (or other) series of numbers; and with the increase or decrease being non-predictable, and being calculated ad-hoc for each candidate frame, without necessarily being "in line" with previous increases or decreases or modifications.

Some conventional systems may locally modify a header of a packet for local purposes of co-located local media playback; and not in order to induce or elicit or force a remote device or a remote play-out device, which is located remotely and across the IP network. In contrast, the present invention may modify the RTP headers, together with re-scheduling the transmission time of an RTP packet, thereby inducing the remote receiver (across the IP network) to increase or decrease its jitter buffer delay.

In some embodiments, RTP header of a single frame may be modified; or RTP header(s) of multiple frames may be modified; or RTP header(s) of a multi-frame VoIP packet may be modified. In some embodiments, the terms "frame" (or RTP frame) and "packet" (or VoIP packet) may be used interchangeably, as in some implementations a VoIP packet may comprise a single RTP frame, or, a single RTP frame may be comprised in a VoIP packet. Some implementations may operate with a jitter buffer, or with an SBC, which receives (as input) local VoIP packets having a varying number of frames (e.g., a first VoIP packet comprising two frames; then a second VoIP packet comprising one frame; then a third VoIP packet comprising three frames, or the like). Additionally or alternatively, some implementations may operate with a jitter buffer, or with an SBC, which generates (as output, intended for transmission to a remote VoIP device) outgoing VoIP packets having a varying number of frames (e.g., a first outgoing VoIP packet comprising two frames; then a second outgoing VoIP packet comprising one frame; then a third outgoing VoIP packet comprising three frames, or the like). Additionally or alternatively, some implementations may operate with a jitter buffer, or with an SBC, which generates (as output, intended for transmission to a remote VoIP device) outgoing VoIP packets having a constant or fixed or non-varying number of frames (e.g., a first outgoing VoIP packet comprising a single frame; then a second outgoing VoIP packet comprising a single frame; then a third outgoing VoIP packet comprising a single frame, or the like). Some embodiments may utilize, or may perform, encapsulation of frames, or frame encapsulation; for example, the SBC receiving local frames, and encapsulating them into outgoing multi-frame VoIP packets that are intended for transmission to the remote VoIP device. Some embodiments may be used with non-encapsulated VoIP packets, for example, the SBC receiving local frames, and generating (as output) single-frame VoIP packets that are intended for transmission to the remote VoIP device (e.g., without encapsulating two or more frames into an encapsulated multi-frame VoIP packet).

Some embodiments may operate without encoding, or without re-encoding, or without trans-coding, the payload of audio frames and/or the payload of VoIP packets. For example, the SBC: (a) may receive a local VoIP packet that is intended for transmission over IP network to a remote VoIP device; (b) may locally and temporarily decode the VoIP packet (e.g., only for the purposes of assessing whether the packet corresponds to silence, or to non-voiced frame, or to a preferred voiced frame based on ZIR/ZSR calculations); (c) may perform RTP header modification of that VoIP packet without encoding and without re-encoding the payload of that VoIP packet; and (d) may thus generate a modified VoIP packet that did not undergo re-encoding of its payload (the avoided re-encoding would have require processing time, processing resources, and may cause degradation in voice quality or audio quality).

Some embodiments may operate without encoding, or without re-encoding, or without trans-coding, the payload of audio frames and/or the payload of VoIP packets; except for performing lossless entropy coding or lossless range coding on such payload. For example, the SBC: (A) may receive a local VoIP packet that is intended for transmission over IP network to a remote VoIP device; (B) may locally and temporarily perform entropy decoding or range decoding, to de-compress or re-arrange the already-encoded payload data which had been entropy-coded or range-coded; (C) may locally and temporarily decode the VoIP packet (e.g., only for the purposes of assessing whether the packet corresponds to silence, or to non-voiced frame, or to a preferred voiced frame based on ZIR/ZSR calculations); (D) may perform RTP header modification of that VoIP packet without encoding and without re-encoding the payload of that VoIP packet; (E) may perform lossless entropy-coding or lossless range-coding on modified RTP frame(s), still without re-encoding the payload itself (e.g., without utilizing any lossy encoding algorithm); and (F) may thus generate a modified VoIP packet that did not undergo any lossy re-encoding of its payload (the avoided re-encoding would have require processing time, processing resources, and may cause degradation in voice quality or audio quality).

Some embodiments may operate in real-time, or substantially in real-time, such that VoIP packets and/or RTP frames are being processed at the local SBC (and/or its local jitter buffer), on their route in real-time, prior to being transferred to the IP network for delivery to the remote VoIP device; and without requiring offline analysis or postponed processing of packets or frames, and without causing a non-desired delay in the transport of the VoIP to the remote device.

In some embodiments, a method of Voice over Internet Protocol (VoIP) communication, may comprise: receiving from a local VoIP device, a data stream comprising a set of VoIP packets, intended for transmission over an IP network to a remote VoIP device; and modifying a Real Time Protocol (RTP) header of at least one of said VoIP packets to modify a jitter buffer delay of said data stream; wherein the method comprises decreasing the jitter buffer delay of said data stream by performing: (a) identifying a pair of consecutive packets in the incoming data stream, the pair of consecutive packets having consecutive sequence numbers; (b) decreasing a sequence number and a time-stamp in an RTP header of at least a latter packet in said pair of consecutive packets, wherein the decreasing comprises: non-sequentially decreasing the sequence number in the RTP header by a natural number computed based on a target decrease in jitter buffer delay of a remote VoIP component to which a modified data stream is to be transmitted; (c) transmitting to the remote VoIP component the modified data stream which reflects packet deletion, to cause the remote VoIP component to skip a packet and to cause reduction of jitter buffer delay at the remote VoIP component.

In some embodiments, the method may comprise: selecting particular VoIP packets for RTP header modification, based on a priority order, according to which: (a) firstly, selecting silence frames for RTP header modification; (b) then, selecting non-silence unvoiced frames; (c) then, selecting voiced frames based on analysis of a Zero Input Response ZIR of a candidate frame to one or more filters. This may be performed by a frame selector, or a VoIP packet selector, which may select the packets or frames for RTP header modification, based on the pre-defined priority ordered.

In some embodiments, the method may comprise: selecting to perform RTP modification on a non-silent unvoiced frame, over a voiced frame. This may be performed by a frame selector, or a VoIP packet selector, which may select the packets or frames for RTP header modification, based on the pre-defined priority ordered.

In some embodiments, the method may comprise: determining to perform RTP modification which increases RTP sequence number, on a particular candidate voiced frame, if a Zero Input Response (ZIR) of a Long Term Prediction (LTP) filter and a Linear Prediction Coefficient (LPC) filter, for said particular candidate voiced frame, is smaller than a Zero State Response (ZSR) of said LTP and LPC filters. This may be performed by a frame selector, or a VoIP packet selector, which may select the packets or frames for RTP header modification, based on the pre-defined priority ordered; optionally in association with ZIR analyzer or ZIR estimator module.

In some embodiments, the method may comprise: determining to perform RTP modification which increases RTP sequence number, on a particular candidate voiced frame, if a Zero Input Response (ZIR) of a Long Term Prediction (LTP) filter, for said particular candidate voiced frame, is smaller than a Zero State Response (ZSR) of said LTP filter. This may be performed by a frame selector, or a VoIP packet selector, which may select the packets or frames for RTP header modification, based on the pre-defined priority ordered; optionally in association with ZIR analyzer or ZIR estimator module.

In some embodiments, the method may comprise: determining to perform RTP modification which increases RTP sequence number, on a particular candidate voiced frame, if a Zero Input Response (ZIR) of a Linear Prediction Coefficient (LPC) filter, for said particular candidate voiced frame, is smaller than a Zero State Response (ZSR) of said LPC filters. This may be performed by a frame selector, or a VoIP packet selector, which may select the packets or frames for RTP header modification, based on the pre-defined priority ordered; optionally in association with ZIR analyzer or ZIR estimator module.

In some embodiments, the method may comprise: determining to perform RTP modification which increases RTP sequence number, on a particular candidate voiced frame, if a Zero Input Response (ZIR) of a Long Term Prediction (LTP) filter and a Linear Prediction Coefficient (LPC) filter, for said particular candidate voiced frame, is close by no more than 25 percent to a ZIR value of the frame immediately before said particular candidate voiced frame. This may be performed by a frame selector, or a VoIP packet selector, which may select the packets or frames for RTP header modification, based on the pre-defined priority ordered; optionally in association with ZIR analyzer or ZIR estimator module; or in association with a similarity estimator or a proximity estimator, able to estimate or determine if two frames (or their respective ZIRs) are sufficiently close or sufficiently similar.

In some embodiments, the method may comprise: determining to perform RTP modification which decreases RTP sequence number, by performing: (a) checking if a Zero Input Response (ZIR) of a Long Term Prediction (LTP) filter and a Linear Prediction Coefficient (LPC) filter, for a particular voiced frame, is close by no more than 25 percent to a ZIR value of the frame immediately before said particular voiced frame; (b) if the checking result is positive, then: (i) discarding said particular voiced frame; and (ii) decreasing an RTP sequence number of the frame which is immediately after said particular voiced frame.

In some embodiments, the method may comprise: determining to perform RTP modification which decreases RTP sequence number, by performing: (a) checking if a Zero Input Response (ZIR) of a Long Term Prediction (LTP) filter, for a particular voiced frame, is close by no more than 25 percent to a ZIR value of the frame immediately before said particular voiced frame; (b) if the checking result is positive, then: (i) discarding said particular voiced frame; and (ii) decreasing an RTP sequence number of the frame which is immediately after said particular voiced frame.

In some embodiments, the method may comprise: determining to perform RTP modification which decreases RTP sequence number, by performing: (a) checking if a Zero Input Response (ZIR) of a Linear Prediction Coefficient (LPC) filter, for a particular voiced frame, is close by no more than 25 percent to a ZIR value of the frame immediately before said particular voiced frame; (b) if the checking result is positive, then: (i) discarding said particular voiced frame; and (ii) decreasing an RTP sequence number of the frame which is immediately after said particular voiced frame.

In some embodiments, the method may comprise, checking the ZIR value of a candidate frame; and based on the ZIR checking result (by itself, and/or relative to ZSR, and/or relative to ZIR of a previous frame), determining to discard the candidate frame (or, to discard the frame that is immediately after the candidate frame), and/or determining to increase or decrease RTP header sequence number(s) of the candidate frame and/or of the frame which is immediately after the candidate frame.

In some embodiments, the method may comprise: receiving from a local VoIP device, a multi-frame VoIP packet intended for transmission to the remote VoIP component; performing entropy decoding (or range decoding) on the multi-frame VoIP packet, to generate multiple frames; placing the multiple frames into a local jitter buffer; performing RTP header modification on one or more of said multiple frames in said local jitter buffer; upon exit of said multiple frames from the local jitter buffer, performing entropy encoding (or range encoding) on said multiple frames to generate a modified multi-frame packet; transmitting the modified multi-frame packet to the remote VoIP component over the IP network. Optionally, an entropy coder or encoder or decoder (or a range coder or encoder or decoder) may be used, or other suitable lossless entropy coding module may be used.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" or "a plurality" as used herein include, for example, "multiple" or "two or more". For example, "a plurality of items" includes two or more items.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

Some embodiments may be implemented by software, by hardware, or by any combination of software and/or hardware as may be suitable for specific applications or in accordance with specific design requirements. Some embodiments may include units and/or sub-units, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Some embodiments may be implemented, for example, using a machine-readable medium or article which may store an instruction or a set of instructions that, if executed by a machine, cause the machine (e.g., a computer or an electronic device) to perform a method and/or operations described herein.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method of Voice over Internet Protocol (VoIP) communication, the method comprising:
receiving a data stream comprising a set of VoIP packets; and
modifying a Real Time Protocol (RTP) header of at least one of said VoIP packets to modify a jitter buffer delay of said data stream, wherein the method comprises decreasing the jitter buffer delay of said data stream by performing:
(a) identifying a pair of consecutive packets in the incoming data stream, the pair of consecutive packets having consecutive sequence numbers;
(b) decreasing a sequence number and a time-stamp in an RTP header of at least a latter packet in said pair of consecutive packets, wherein the decreasing comprises: non-sequentially decreasing the sequence number in the RTP header by a natural number computed based on a target decrease in jitter buffer delay of a remote VoIP component to which a modified data stream is to be transmitted;

(c) transmitting to the remote VoIP component the modified data stream which reflects packet deletion, to cause the remote VoIP component to skip a packet and to cause reduction of jitter buffer delay at the remote VoIP component;

wherein the method comprises: selecting particular VoIP packets for RTP header modification, based on a priority order, according to which: (A) firstly, selecting silence frames for RTP header modification; (B) then, selecting non-silence unvoiced frames; (C) then, selecting voiced frames based on analysis of a Zero Input Response (ZIR) of a candidate frame to one or more filters.

2. The method of claim 1, comprising decreasing the jitter buffer delay by:
dropping at least one packet from said data stream; and
decreasing a sequence number and a timestamp value in an RTP header of at least one additional packet subsequent to said at least one packet.

3. The method of claim 2, comprising:
decreasing a sequence number and a timestamp value in RTP headers of all packets subsequent to said at least one packet.

4. The method of claim 1, comprising:
modifying the RTP header without decoding a payload of any VoIP packet of said data stream.

5. The method of claim 1, comprising:
modifying the RTP header without re-encoding a payload of any VoIP packet of said data stream.

6. The method of claim 1, comprising:
detecting a portion of the data stream which corresponds to a silence period; and
modifying the RTP headers of one or more VoIP packets of that portion of the data stream more frequently relative to modification of RTP headers in other portions of said data stream.

7. The method of claim 1, comprising:
selecting to perform RTP modification on a non-silent unvoiced frame, over a voiced frame.

8. A method of Voice over Internet Protocol (VoIP) communication, the method comprising:
receiving a data stream comprising a set of VoIP packets; and
modifying a Real Time Protocol (RTP) header of at least one of said VoIP packets to modify a jitter buffer delay of said data stream, wherein the method comprises decreasing the jitter buffer delay of said data stream by performing:

(a) identifying a pair of consecutive packets in the incoming data stream, the pair of consecutive packets having consecutive sequence numbers;

(b) decreasing a sequence number and a time-stamp in an RTP header of at least a latter packet in said pair of consecutive packets, wherein the decreasing comprises: non-sequentially decreasing the sequence number in the RTP header by a natural number computed based on a target decrease in jitter buffer delay of a remote VoIP component to which a modified data stream is to be transmitted;

(c) transmitting to the remote VoIP component the modified data stream which reflects packet deletion, to cause the remote VoIP component to skip a packet and to cause reduction of jitter buffer delay at the remote VoIP component;

wherein the method comprises:
determining to perform RTP modification which increases RTP sequence number, on a particular candidate voiced frame, if a Zero Input Response (ZIR) of a Long Term Prediction (LTP) filter and a Linear Prediction Coefficient (LPC) filter, for said particular candidate voiced frame, is smaller than a Zero State Response (ZSR) of said LTP and LPC filters.

9. A method of Voice over Internet Protocol (VoIP) communication, the method comprising:
receiving a data stream comprising a set of VoIP packets; and
modifying a Real Time Protocol (RTP) header of at least one of said VoIP packets to modify a jitter buffer delay of said data stream, wherein the method comprises decreasing the jitter buffer delay of said data stream by performing:

(a) identifying a pair of consecutive packets in the incoming data stream, the pair of consecutive packets having consecutive sequence numbers;

(b) decreasing a sequence number and a time-stamp in an RTP header of at least a latter packet in said pair of consecutive packets, wherein the decreasing comprises: non-sequentially decreasing the sequence number in the RTP header by a natural number computed based on a target decrease in jitter buffer delay of a remote VoIP component to which a modified data stream is to be transmitted;

(c) transmitting to the remote VoIP component the modified data stream which reflects packet deletion, to cause the remote VoIP component to skip a packet and to cause reduction of jitter buffer delay at the remote VoIP component;

wherein the method comprises:
determining to perform RTP modification which increases RTP sequence number, on a particular candidate voiced frame, if a Zero Input Response (ZIR) of a Long Term Prediction (LTP) filter, for said particular candidate voiced frame, is smaller than a Zero State Response (ZSR) of said LTP filter.

10. A method of Voice over Internet Protocol (VoIP) communication, the method comprising:
receiving a data stream comprising a set of VoIP packets; and
modifying a Real Time Protocol (RTP) header of at least one of said VoIP packets to modify a jitter buffer delay of said data stream, wherein the method comprises decreasing the jitter buffer delay of said data stream by performing:

(a) identifying a pair of consecutive packets in the incoming data stream, the pair of consecutive packets having consecutive sequence numbers;

(b) decreasing a sequence number and a time-stamp in an RTP header of at least a latter packet in said pair of consecutive packets, wherein the decreasing comprises: non-sequentially decreasing the sequence number in the RTP header by a natural number computed based on a target decrease in jitter buffer delay of a remote VoIP component to which a modified data stream is to be transmitted;

(c) transmitting to the remote VoIP component the modified data stream which reflects packet deletion, to cause the remote VoIP component to skip a packet and to cause reduction of jitter buffer delay at the remote VoIP component;

wherein the method comprises:

determining to perform RTP modification which increases RTP sequence number, on a particular candidate voiced frame, if a Zero Input Response (ZIR) of a Linear Prediction Coefficient (LPC) filter, for said particular candidate voiced frame, is smaller than a Zero State Response (ZSR) of said LPC filters.

11. A method of Voice over Internet Protocol (VoIP) communication, the method comprising:

receiving a data stream comprising a set of VoIP packets; and modifying a Real Time Protocol (RTP) header of at least one of said VoIP packets to modify a jitter buffer delay of said data stream, wherein the method comprises decreasing the jitter buffer delay of said data stream by performing:

(A) identifying a pair of consecutive packets in the incoming data stream, the pair of consecutive packets having consecutive sequence numbers;

(B) decreasing a sequence number and a time-stamp in an RTP header of at least a latter packet in said pair of consecutive packets, wherein the decreasing comprises: non-sequentially decreasing the sequence number in the RTP header by a natural number computed based on a target decrease in jitter buffer delay of a remote VoIP component to which a modified data stream is to be transmitted;

(C) transmitting to the remote VoIP component the modified data stream which reflects packet deletion, to cause the remote VoIP component to skip a packet and to cause reduction of jitter buffer delay at the remote VoIP component;

wherein the method comprises:

determining to perform RTP modification which decreases RTP sequence number, by performing:

(a) checking if a Zero Input Response (ZIR) of a Long Term Prediction (LTP) filter and a Linear Prediction Coefficient (LPC) filter, for a particular voiced frame, is close by no more than 25 percent to a ZIR value of the frame immediately before said particular voiced frame;

(b) if the checking result is positive, then: (i) discarding said particular voiced frame; and (ii) decreasing an RTP sequence number of the frame which is immediately after said particular voiced frame.

12. A method of Voice over Internet Protocol (VoIP) communication, the method comprising:

receiving a data stream comprising a set of VoIP packets; and modifying a Real Time Protocol (RTP) header of at least one of said VoIP packets to modify a jitter buffer delay of said data stream, wherein the method comprises decreasing the jitter buffer delay of said data stream by performing:

(A) identifying a pair of consecutive packets in the incoming data stream, the pair of consecutive packets having consecutive sequence numbers;

(B) decreasing a sequence number and a time-stamp in an RTP header of at least a latter packet in said pair of consecutive packets, wherein the decreasing comprises: non-sequentially decreasing the sequence number in the RTP header by a natural number computed based on a target decrease in jitter buffer delay of a remote VoIP component to which a modified data stream is to be transmitted;

(C) transmitting to the remote VoIP component the modified data stream which reflects packet deletion, to cause the remote VoIP component to skip a packet and to cause reduction of jitter buffer delay at the remote VoIP component;

wherein the method comprises:

determining to perform RTP modification which decreases RTP sequence number, by performing:

(a) checking if a Zero Input Response (ZIR) of a Long Term Prediction (LTP) filter, for a particular voiced frame, is close by no more than 25 percent to a ZIR value of the frame immediately before said particular voiced frame;

(b) if the checking result is positive, then: (i) discarding said particular voiced frame; and (ii) decreasing an RTP sequence number of the frame which is immediately after said particular voiced frame.

13. A method of Voice over Internet Protocol (VoIP) communication, the method comprising:

receiving a data stream comprising a set of VoIP packets; and modifying a Real Time Protocol (RTP) header of at least one of said VoIP packets to modify a jitter buffer delay of said data stream, wherein the method comprises decreasing the jitter buffer delay of said data stream by performing:

(A) identifying a pair of consecutive packets in the incoming data stream, the pair of consecutive packets having consecutive sequence numbers;

(B) decreasing a sequence number and a time-stamp in an RTP header of at least a latter packet in said pair of consecutive packets, wherein the decreasing comprises: non-sequentially decreasing the sequence number in the RTP header by a natural number computed based on a target decrease in jitter buffer delay of a remote VoIP component to which a modified data stream is to be transmitted;

(C) transmitting to the remote VoIP component the modified data stream which reflects packet deletion, to cause the remote VoIP component to skip a packet and to cause reduction of jitter buffer delay at the remote VoIP component;

wherein the method comprises:

determining to perform RTP modification which decreases RTP sequence number, by performing:

(a) checking if a Zero Input Response (ZIR) of a Linear Prediction Coefficient (LPC) filter, for a particular voiced frame, is close by no more than 25 percent to a ZIR value of the frame immediately before said particular voiced frame;

(b) if the checking result is positive, then: (i) discarding said particular voiced frame; and (ii) decreasing an RTP sequence number of the frame which is immediately after said particular voiced frame.

14. A method of Voice over Internet Protocol (VoIP) communication, the method comprising:

receiving a data stream comprising a set of VoIP packets; and modifying a Real Time Protocol (RTP) header of at least one of said VoIP packets to modify a jitter buffer delay of said data stream, wherein the method comprises decreasing the jitter buffer delay of said data stream by performing:

(A) identifying a pair of consecutive packets in the incoming data stream, the pair of consecutive packets having consecutive sequence numbers;

(B) decreasing a sequence number and a time-stamp in an RTP header of at least a latter packet in said pair of consecutive packets, wherein the decreasing comprises: non-sequentially decreasing the sequence number in the RTP header by a natural number computed based on a target decrease in jitter buffer delay of a remote VoIP component to which a modified data stream is to be transmitted;

(C) transmitting to the remote VoIP component the modified data stream which reflects packet deletion, to cause the remote VoIP component to skip a packet and to cause reduction of jitter buffer delay at the remote VoIP component;

wherein the method comprises:

receiving from a local VoIP device, a multi-frame VoIP packet intended for transmission to the remote VoIP component;

performing entropy decoding on the multi-frame VoIP packet, to generate multiple frames;

placing the multiple frames into a local jitter buffer;

performing RTP header modification on one or more of said multiple frames in said local jitter buffer;

upon exit of said multiple frames from the local jitter buffer, performing entropy encoding on said multiple frames to generate a modified multi-frame packet;

transmitting the modified multi-frame packet to the remote VoIP component over the IP network.

15. A method of Voice over Internet Protocol (VoIP) communication, the method comprising:

receiving a data stream comprising a set of VoIP packets; and modifying a Real Time Protocol (RTP) header of at least one of said VoIP packets to modify a jitter buffer delay of said data stream, wherein the method comprises decreasing the jitter buffer delay of said data stream by performing:

(A) identifying a pair of consecutive packets in the incoming data stream, the pair of consecutive packets having consecutive sequence numbers;

(B) decreasing a sequence number and a time-stamp in an RTP header of at least a latter packet in said pair of consecutive packets, wherein the decreasing comprises: non-sequentially decreasing the sequence number in the RTP header by a natural number computed based on a target decrease in jitter buffer delay of a remote VoIP component to which a modified data stream is to be transmitted;

(C) transmitting to the remote VoIP component the modified data stream which reflects packet deletion, to cause the remote VoIP component to skip a packet and to cause reduction of jitter buffer delay at the remote VoIP component;

wherein the method comprises:

receiving from a local VoIP device, a multi-frame VoIP packet intended for transmission to the remote VoIP component;

performing range decoding on the multi-frame VoIP packet, to generate multiple frames;

placing the multiple frames into a local jitter buffer;

performing RTP header modification on one or more of said multiple frames in said local jitter buffer;

upon exit of said multiple frames from the local jitter buffer, performing range encoding on said multiple frames to generate a modified multi-frame packet;

transmitting the modified multi-frame packet to the remote VoIP component over the IP network.

16. An apparatus of Voice over Internet Protocol (VoIP) communication, the apparatus comprising:

a jitter buffer to receive a data stream comprising a set of VoIP packets; and a Real Time Protocol (RTP) header modifier to modify an RTP header of at least one of said VoIP packets to modify a jitter buffer delay of said data stream, wherein the RTP header modifier is to decrease the jitter buffer delay by performing:

(a) identifying a pair of consecutive packets in the incoming data stream, the pair of consecutive packets having consecutive sequence numbers;

(b) decreasing a sequence number in an RTP header of at least a latter packet in said pair of consecutive packets, wherein the decreasing comprises: non-sequentially decreasing the sequence number in the RTP header by a natural number computed based on a target decrease in jitter buffer delay of a remote VoIP component to which a modified data stream is to be transmitted;

(c) transmitting to the remote VoIP component the modified data stream which reflects packet deletion, to cause the remote VoIP component to skip a packet and to cause reduction of jitter buffer delay at the remote VoIP component;

wherein the RTP header modifier is:

(A) to receive from a local VoIP device, a multi-frame VoIP packet intended for transmission to the remote VoIP component;

(B) to perform range decoding on the multi-frame VoIP packet, to generate multiple frames;

(C) to place the multiple frames into a local jitter buffer;

(D) to perform RTP header modification on one or more of said multiple frames in said local jitter buffer;

(E) upon exit of said multiple frames from the local jitter buffer, to perform range encoding on said multiple frames to generate a modified multi-frame packet;

(F) to transmit the modified multi-frame packet to the remote VoIP component over the IP network.

17. The apparatus of claim 16, wherein the RTP header modifier is to select particular VoIP packets for RTP header modification, based on a priority order, according to which: (a) firstly, selecting silence frames for RTP header modification; (b) then, selecting non-silence unvoiced frames; (c) then, selecting voiced frames based on analysis of a Zero Input Response (ZIR) of a candidate frame to one or more filters.

18. The apparatus of claim 16, wherein the RTP header modifier is to select to perform RTP modification on a non-silent unvoiced frame, over a voiced frame.

19. The apparatus of claim 16, wherein the RTP header modifier is to determine to perform RTP modification which increases RTP sequence number, on a particular candidate voiced frame, if a Zero Input Response (ZIR) of a Long Term Prediction (LTP) filter and a Linear Prediction Coefficient (LPC) filter, for said particular candidate voiced frame, is smaller than a Zero State Response (ZSR) of said LTP and LPC filters.

20. The apparatus of claim 16, wherein the RTP header modifier is to determine to perform RTP modification which increases RTP sequence number, on a particular candidate voiced frame, if a Zero Input Response (ZIR) of a Long Term Prediction (LTP) filter, for said particular candidate voiced frame, is smaller than a Zero State Response (ZSR) of said LTP filter.

21. The apparatus of claim 16, wherein the RTP header modifier is to determine to perform RTP modification which increases RTP sequence number, on a particular candidate voiced frame, if a Zero Input Response (ZIR) of a Linear Prediction Coefficient (LPC) filter, for said particular candidate voiced frame, is smaller than a Zero State Response (ZSR) of said LPC filters.

22. The apparatus of claim 16, wherein the RTP header modifier is to determine to perform RTP modification which decreases RTP sequence number, by performing:
  (a) checking if a Zero Input Response (ZIR) of a Long Term Prediction (LTP) filter and a Linear Prediction Coefficient (LPC) filter, for a particular voiced frame, is close by no more than 25 percent to a ZIR value of the frame immediately before said particular voiced frame;
  (b) if the checking result is positive, then: (i) discarding said particular voiced frame; and (ii) decreasing an RTP sequence number of the frame which is immediately after said particular voiced frame.

23. The apparatus of claim 16, wherein the RTP header modifier is to determine to perform RTP modification which decreases RTP sequence number, by performing:
  (a) checking if a Zero Input Response (ZIR) of a Long Term Prediction (LTP) filter, for a particular voiced frame, is close by no more than 25 percent to a ZIR value of the frame immediately before said particular voiced frame;
  (b) if the checking result is positive, then: (i) discarding said particular voiced frame; and (ii) decreasing an RTP sequence number of the frame which is immediately after said particular voiced frame.

24. The apparatus of claim 16, wherein the RTP header modifier is to determine to perform RTP modification which decreases RTP sequence number, by performing:
  (a) checking if a Zero Input Response (ZIR) of a Linear Prediction Coefficient (LPC) filter, for a particular voiced frame, is close by no more than 25 percent to a ZIR value of the frame immediately before said particular voiced frame;
  (b) if the checking result is positive, then: (i) discarding said particular voiced frame; and (ii) decreasing an RTP sequence number of the frame which is immediately after said particular voiced frame.

25. The apparatus of claim 16, wherein the apparatus comprises a session border controller.

* * * * *